Nov. 6, 1934.   R. D. HULSLANDER   1,979,552
METHOD AND APPARATUS FOR REMOVING CORES FROM TIRES
Filed March 6, 1933   9 Sheets-Sheet 1

INVENTOR
Ray D. Hulslander
BY
Ely & Barrow
ATTORNEYS

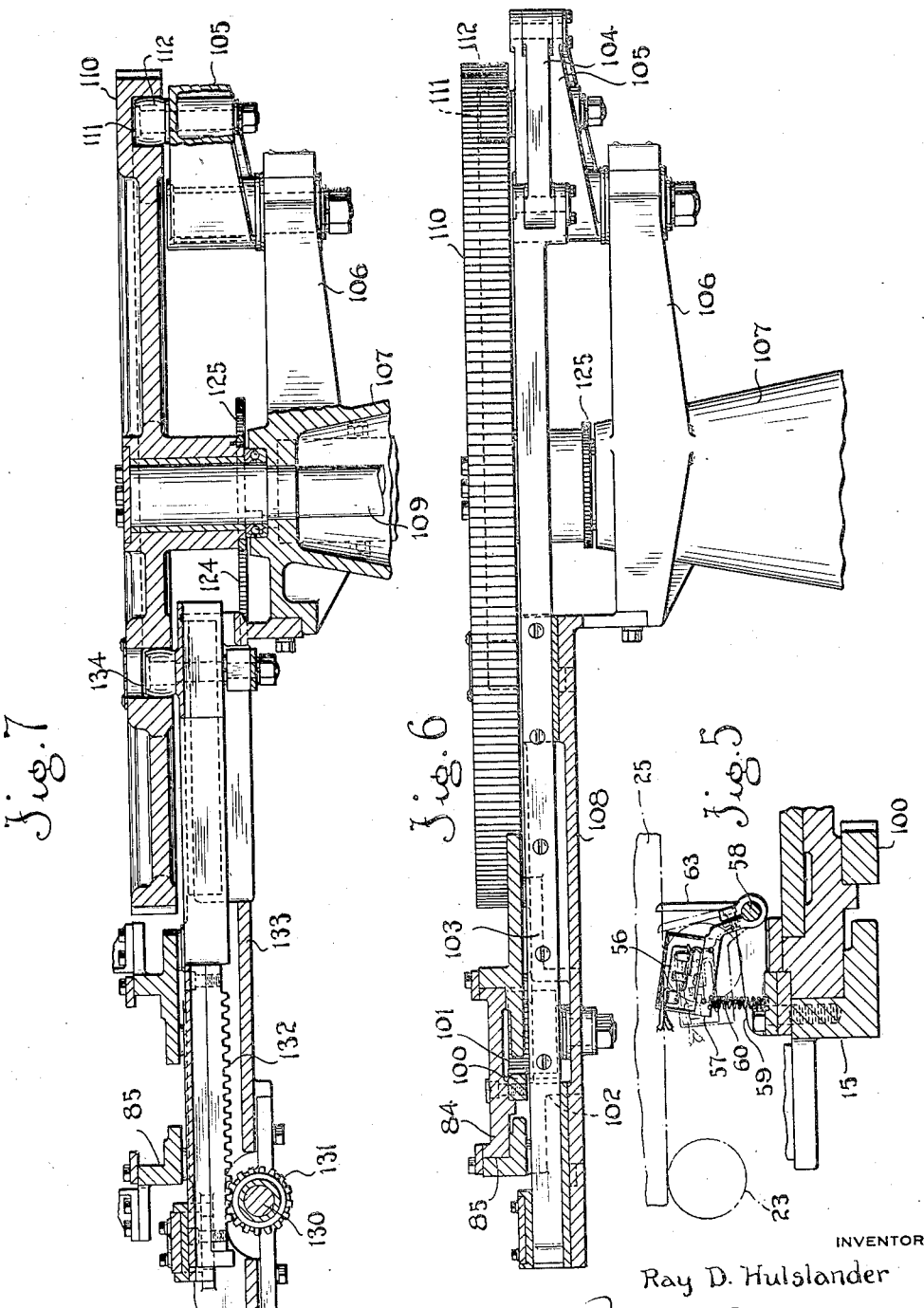

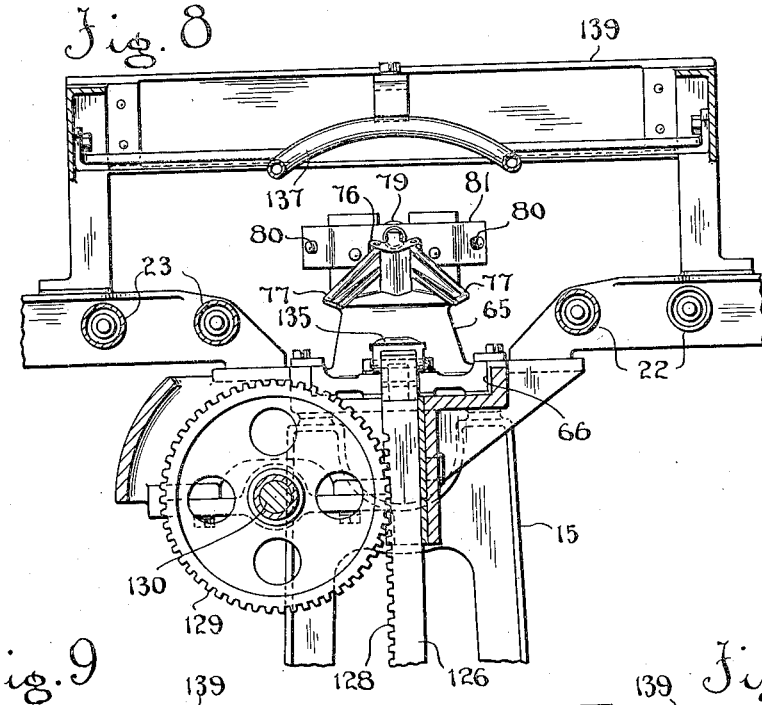
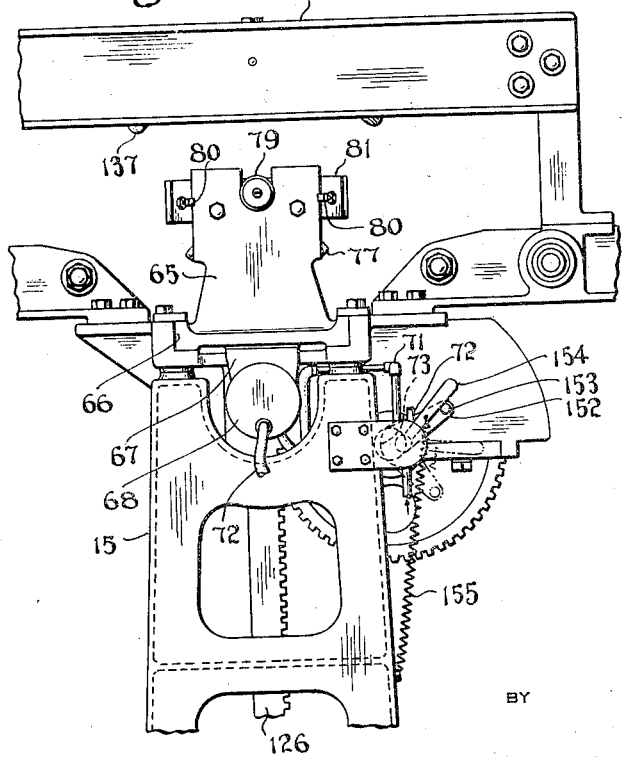
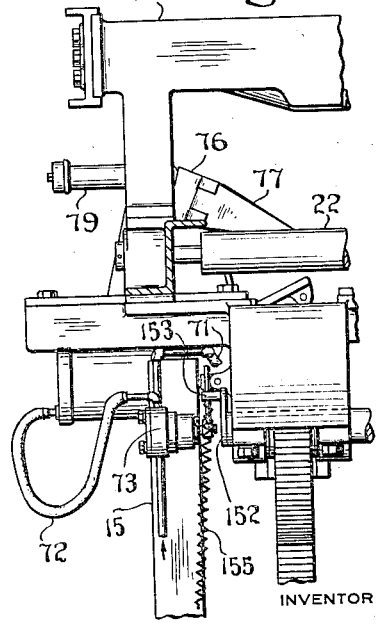

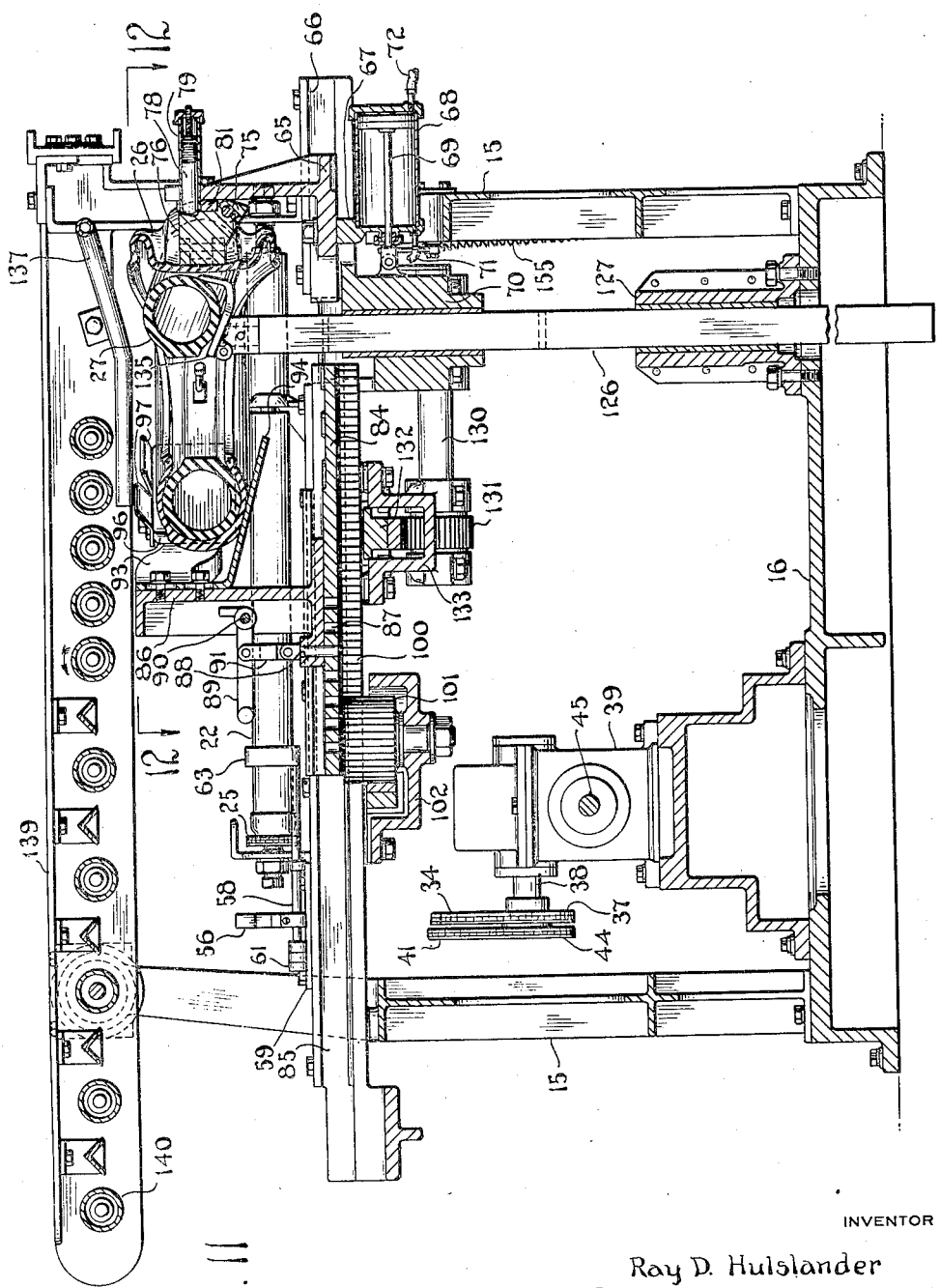

Nov. 6, 1934.                R. D. HULSLANDER                 1,979,552
              METHOD AND APPARATUS FOR REMOVING CORES FROM TIRES
                    Filed March 6, 1933        9 Sheets-Sheet 8

INVENTOR
Ray D. Hulslander
BY
Ely & Barrow
ATTORNEYS

Patented Nov. 6, 1934

1,979,552

UNITED STATES PATENT OFFICE 1,979,552

METHOD AND APPARATUS FOR REMOVING CORES FROM TIRES

Ray D. Hulslander, Akron, Ohio, assignor to The Firestone Tire & Rubber Company, Akron, Ohio, a corporation of Ohio Application March 6, 1933, Serial No. 659,741

12 Claims. (Cl. 18—2)

This invention relates to methods and apparatus for removing cores from tires, and more especially it relates to procedure and mechanism for extracting flexible expansible cores such as air bags and/or water bags from pneumatic tire casings after the vulcanization of the latter.

The chief objects of the invention are to provide for the feeding of tires with expansible cores therein along a determinate course, and for extracting the cores from the tires automatically at one point in said course; to provide apparatus for accomplishing the foregoing object wherein the tire itself actuates the core-extracting mechanism; to provide automatically for conveying the extracted core to a determinate destination; and to utilize the reaction from the deforming strains imposed upon the core, during the removal thereof from a tire, for placing the core upon a core-conveyor. Another object is the provision of means for preventing extreme distortion and kinking of tire beads during the removal of cores from tires. Further objects include the saving of time and manual labor. Other objects will be manifest.

Of the accompanying drawings:

Figure 5 is a section on the line 5—5 of Figure 3;

Figure 6 is a section on the line 6—6 of Figure 3;

Figure 7 is a section on the line 7—7 of Figure 3;

Figure 8 is a section on the line 8—8 of Figure 4;

Figure 9 is rear elevation of the mechanism shown in Figure 8;

Figure 10 is a side elevation of the mechanism shown in Figure 9, as viewed from the right thereof;

Figure 11 is a view of the mechanism shown in Figure 4, in one of its operative positions, and the work therein;

Figure 1:
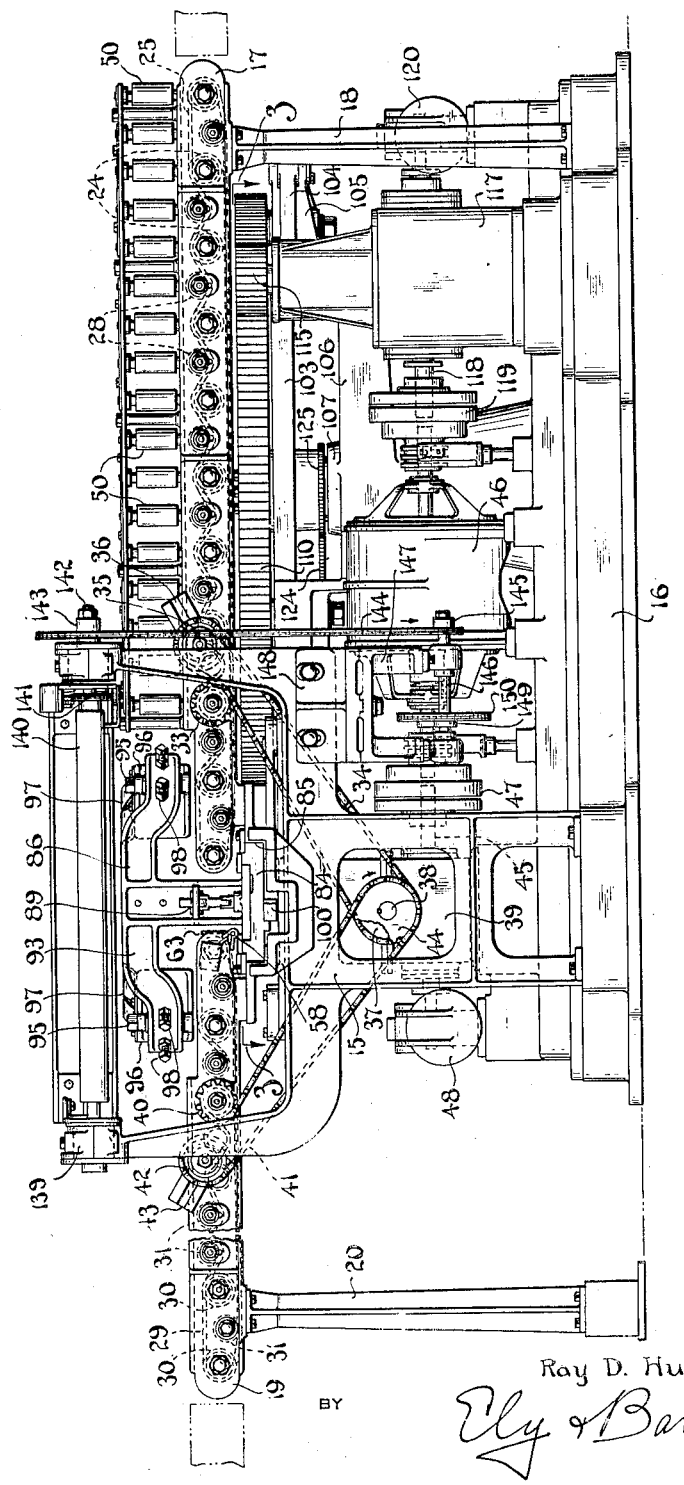
Figure 1 is a side elevation of apparatus embodying the invention in its preferred form.

In general, the apparatus comprises a core-extracting station, on one side of which is a conveyor for delivering a succession of tires with flexible, expansible cores therein to the core-extracting station, and on the other side of which is a work-removing conveyor for tires from which the cores have been extracted. The drive of the work-delivery and work-removing conveyors is controlled by the work, which stops the conveyor-drive when a tire is in proper position at the core-extracting station. The core-extracting station comprises means for deforming a tire in its own plane by forming a radial re-entrant in one side thereof such that the bead portions of the tire are spread apart and the core exposed so as to be engaged by a core-removing member. The latter consists of a vertically movable rod or ram having a hook on its upper end, said hook being arranged to engage the exposed portion of the core and pull the core from the tire. A conveyor moving transversely of the previously mentioned conveyors extends partly over the core-extracting station, and receives the extracted core, the latter being so flexed during its removal from the tire as to flip itself off the ram-hook as soon as it is free from the tire.

Referring to the drawings, the core-extracting station of the apparatus comprises a framework generally designated 15 that is mounted upon a base casting 16. To one side of the framework 15 is attached one end of a framework 17 of a work-delivery conveyor, the other end of the latter being mounted upon upright supports 18 rising from the base casting 16. To the opposite side of the framework 15 is secured one end of a framework 19 of a work-removing conveyor, the other end of the latter being carried by upright supports 20. The framework 17 consists of parallel horizontal rails between which are disposed a plurality of parallel, driven rollers 22, 22 that are journaled in said rails. Similarly the framework 19 comprises parallel rails that carry a series of feed rollers 23, 23. At one of its ends, each roller 22 is provided with a sprocket 24 (shown in broken lines in Figure 1), and said sprockets are interconnected by an endless sprocket chain 25 so as to be driven in the proper direction to advance a tire 26 with expansible core 27 therein toward the core-extracting station. Idler sprockets 28, 28 may be journaled between the sprockets 24 to assure good driving engagement of sprockets 24 and chain 25.

In like manner the rollers 23 of the work-removing conveyor are driven by an endless sprocket chain 29 that is trained about sprockets 30 on said rollers and intermediate idler sprockets 31. The rollers 23 are driven in the same direction as rollers 22 so as to remove empty tires 26 from the core-extracting station. For driving the sprocket chain 25, one of the rollers 22 also carries a sprocket 33 that is engaged by an endless sprocket chain 34, the latter being trained about a sprocket 35 that is adjustably mounted upon bracket 36 on framework 17, and a sprocket 37 mounted upon the drive-shaft 38 of a reduction gear device 39. In like manner the sprocket chain 29 is driven by means of a sprocket 40 on one of the rollers 23, said sprocket being engaged by a sprocket chain 41 that is trained about a sprocket 42 carried by a bracket 43 on framework 19, and a sprocket 44 mounted upon the shaft 38 of the reduction gear device 39.

The reduction gear device 39 is mounted upon the base casting 16, at the core-extracting station, and has its shaft 45 connected to a constantly driven motor 46 through a magnetic clutch 47. The other end of shaft 45 may be provided with a magnetic brake 48 that is electrically connected so as to operate in unison with the magnetic clutch 47, to apply braking force to shaft 45 when clutch 47 is opened. The motor 46 is mounted upon the base casting 16. The magnetic clutch 47 and brake 48 are controlled by an electrical switch presently to be described.

Suitably journaled along the top rails of framework 17 of the work-delivery conveyor are respective series of vertically disposed guide-rollers 50, 50 adapted for laterally guiding tires 26 on the feed rollers 22. At one side of the conveyor (the far side as viewed in Figure 2) a plurality of guide rollers 50 nearest the core-extracting station are mounted in a swinging bracket 51 that is pivotally mounted at 52, on the framework 17, said bracket being provided with an outstanding lever-arm 53 connected by one or more tension springs 54 to the framework 17. The arrangement is such that the bracket 51 with rollers 50 thereon is urged obliquely of the delivery conveyor into the path of the work thereon, thus forcing the work against the guide-rollers 50 on the opposite side of the conveyor so that the work is determinately positioned laterally of the conveyor as it comes to the core-extracting station.

At the core extracting station means operated by the work is provided for stopping the drive of the feed rollers 22, 23 of the work-delivery and work-removing conveyors respectively, whereby successive tires 26 with cores therein are brought to a stop in determinate position so as properly to be engaged by the core-extracting instrumentalities. Said means comprises a normally open mercury switch 56 (see Figure 5) that is mounted upon an angular bracket arm 57 that is carried by a rock-shaft 58, the latter being journaled in a suitable two-arm bracket 59 mounted upon a part of the framework 15. A compression spring 60 is mounted between the bracket 59 and arm 57 so as normally to hold the switch in an angular position in which its electrical contacts are open.

One end of rock-shaft 58 is provided with a stop-collar 61 adapted to engage a stud 62 (Figure 3) projecting from bracket 59 to limit the upward lifting of the switch 56 under the impetus of spring 60. The other end of rock-shaft 58 is provided with a trip-lever 63 projecting upwardly into the path of a tire 26. The switch 56 controls the actuation of a limit switch 122 subsequently to be described, and the latter controls the operation of the magnetic clutch 47 and brake 48 to open said clutch and apply the brake to stop the drive of the feed rolls for a determinate time interval. The trip-lever is so positioned as to be engaged by a tire when the latter is disposed centrally of the core-extracting mechanism. Thus said trip-lever is disposed to one side of the center of the core-extracting station as is most clearly shown in Figure 1.

As previously stated, the core-extracting station comprises means for deforming a tire in its own plane so that the core in said tire is exposed for engagement by a core-removing member. Said means operates in a direction that is transverse with relation to the course of the work through the apparatus, and it comprises a movable member on one side of the apparatus adapted to move transversely of the conveyors, and peripherally to engage a tire and to move the tire against a retractable, convex abutment, the latter being of general convex form so as to form a re-entrant in the tire and thereby to cause spreading of the beads of the tire so as to expose the core therein.

Figure 2:
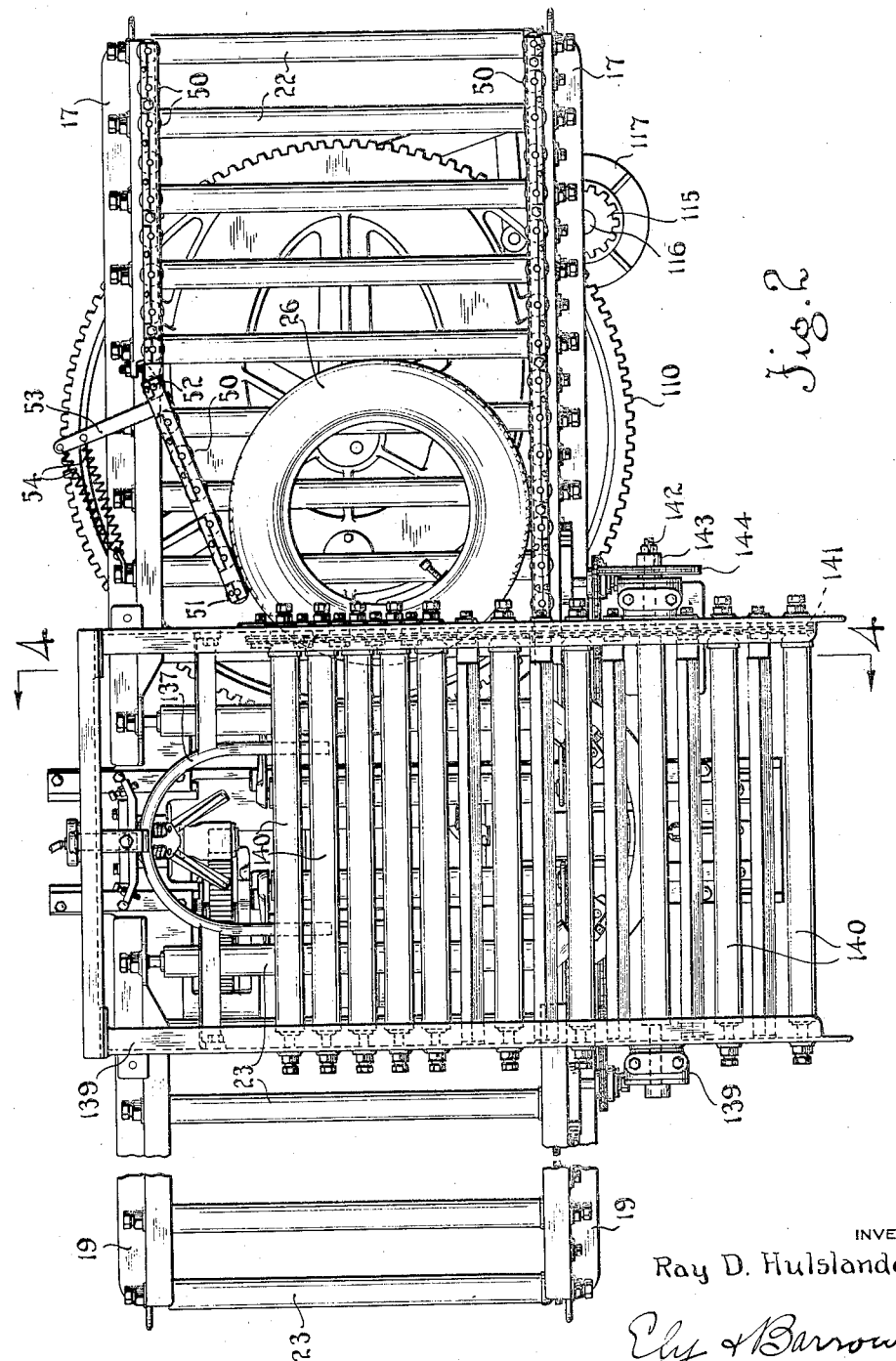
Figure 2 is a plan view thereof, and work therein.

The retractable abutment comprises a head 65 that is mounted for limited sliding movement, transversely of the apparatus, in a slideway 66 formed in the framework 15, at the far side thereof as viewed in Figures 1 and 2. Secured to the bottom of the head 65 and projecting downwardly therefrom, centrally of the slideway 66, is a cylinder head 67 of a double-acting fluid pressure cylinder 68, the latter having a piston rod 69, the outer end of which is connected to a fixed point on a boss 70 constituting a part of the framework 15. The respective ends of the cylinder 68 are provided with the usual fluid inlet-and-outlet pipes 71, 72, the arrangement being such that by alternately charging and discharging the respective ends of the cylinder the head 65 is reciprocated in its slideway 66. The said movements of the head 65 are in determinate time relation to the operation of the core-extracting ram, the operation of the cylinder 68 being controlled by a valve 73 that is mounted on the framework 15 and to which the pipes 71, 72 extend. The valve 73 is operated by mechanism subsequently to be described, and normally fluid pressure is maintained in its front end as is shown in Figures 4 and 11.

Pivotally mounted on a horizontal axis at 75 on the front of head 65 is a pivot-block 76, and hinged to the opposite sides of the latter, on substantially vertical pivots, are tapered stop-plates 77, 77. Normally the block 76 is yieldingly held in a forwardly tilted position by reason of a spring-pressed plunger 78 that is carried in a suitable casing 79 on the head 65 and engages the back of the block 76, above its pivot 75, the shape of block being such that a portion thereof abuts the said block 65 to limit the extent of its forward tilt, as is most clearly shown in Figure 4.

Figure 4:
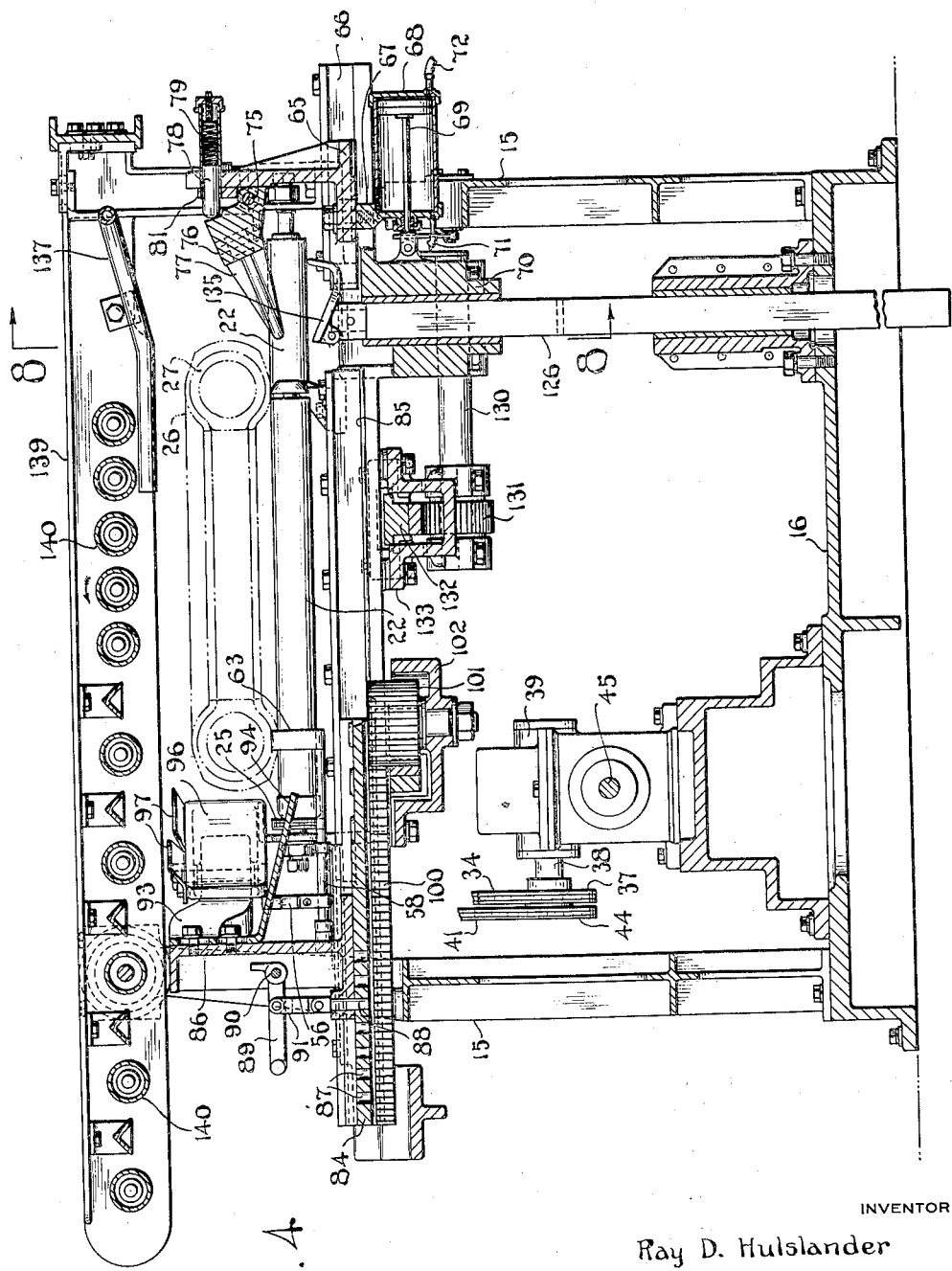
Figure 4 is a section on the line 4—4 of Figure 2.

In the normal, tilted, inoperative position of the block 76 the stop-plates 77 extend forwardly and somewhat downwardly at an angle to each other, as is most clearly shown in Figures 4, 8 and 10. In operation, when engaged by a tire, the plates 77 are adapted to swing to a position wherein they diverge rearwardly as is most clearly shown in Figure 8, the limit of such rearward movement being determined by adjustment screws 80, 80 that extend through the ends of a bracket 81 that is secured to the head 65, and engage the rear faces of the respective plates 77. The block 75 and plates 77 thus constitute the convex abutment hereinbefore mentioned against which a tire is urged to form a re-entrant therein.

The movable work-deforming member is disposed on the opposite side of the conveyors from the retractable abutment just described. It comprises a cross-slide 84 that is slidably mounted in a slideway 85, the latter being formed in the framework 15, in alignment with the slideway 66 and on the opposite side of the framework therefrom. The slide 84 carries a head 86 that is adjustably mounted upon the upper face thereof, the slide being formed with a longitudinal series of recesses or apertures 87, 87 adapted selectively to receive a latch-pin 88 carried by said head 86. The latch-pin is easily manipulated by means of a hand-lever 89 that is pivotally mounted at 90 upon the head 86, the latch-pin being connected to an intermediate point on the hand-lever by means of a link 91. The arrangement is such that the head 86 may be alternatively positioned at various points on the slide according to the size of the tires to be operated upon. The slide 84 is reciprocated in its slideway by mechanism presently to be described.

The slideway 85 and slide 84 are disposed below the work-delivery and work-removal conveyors, the head 84 on said slide extending upwardly between the rollers 22, 23 at the adjacent ends of said conveyors. The top of head 86, above said rollers, is formed with an integral, arcuate, bracket-like formation 93, the concave side of which faces the retractable abutment across the conveyors. Secured to the middle of the concave side of the arcuate structure 93 is a lifting plate 94 that extends obliquely downwardly between the adjacent rollers 22, 23, and is adapted to pass under and slightly lift the side of a tire when the slide 84 is moved across the conveyors. Hingedly mounted on vertical pivots 95, 95 at the respective ends of the arcuate structure 93, on the concave side thereof, are arcuate tire-engaging shoes 96, 96, each of said shoes having a pair of shoe-plates 97, 97, secured to the top thereof and extending beyond the concave lateral face of said shoes. A pair of adjustment screws 98, 98, threaded through the structure 93, are provided for each shoe 96 to adjust the angular position of the latter to enable them properly to engage the perimeter of a tire during the operation of the apparatus. When the shoes are so engaged with a tire, the shoe-plates 97 partly overlie the tire, the lifting plate 94 and shoe-plates 97 thus preventing movement of the tire with relation to the head 96.

For reciprocating the slide 84 and tire-compressing means carried thereby, the under side of said slide is provided with a longitudinally-extending rack 100 that is meshed with a pinion 101 that is journaled on a vertical axis in a suitable bracket 102 secured to the framework 15. The pinion 101 also is meshed with a driving rack 103 that is disposed at right angles to rack 100, and extends laterally, under the framework 17, to the right-hand end of the apparatus as viewed in Figures 1 and 3 where it is connected, through link 104, to the free end of a lever-arm 105.

The latter is pivotally mounted at its opposite end upon a radially extending arm 106 formed upon a pedestal support 107 that is mounted upon the base casting 16 beneath the work-delivery conveyor. A suitable slideway 108, that may be integral with bracket 102 and is partly supported by the pedestal 107, is provided for the rack 103. Journaled upon a vertical spindle 109 in the pedestal 107 is a bull gear 110, the under side of which is formed with a cam-groove 111, and a cam-roller 112 mounted centrally on the lever-arm 105 is engaged in said cam-groove. The cam 111 is so formed that rotation of the bull gear 110 causes reciprocation of rack 103, and, through the mechanism described, causes the slide 84 and tire-compressing means thereon to be reciprocated.

The bull gear 110 is rotated by means of a driving pinion 115 meshed therewith, said pinion being mounted upon the drive shaft 116 of a reduction gear device 117 that is mounted upon the base casting. The reduction gear device comprises a driven shaft 118 that is connected at one end through a magnetic clutch 119 to the motor 46, the other end of the shaft 118 being engaged by a magnetic brake 120 (Figure 1). The clutch 119 and the brake 120 are operated by means of limit switch 122, concurrently with clutch 47 and brake 48 of the work-feeding conveyors, but in reverse order, the clutch 119 being closed when clutch 47 is opened, and brake 120 being released when brake 48 is applied.

Limit switch 122 is mounted upon the pedestal structure 107, and comprises a shaft 123 having a gear 124 thereon, said gear being driven by a pinion 125 mounted upon the hub portion of bull gear 110. The gear 124 and pinion 125 are a 2 to 1 ratio, the gear 124 making one-half a revolution to each revolution of the pinion. No details of the limit switch are shown since it may be of any known or conventional construction. It performs a cycle of operation during each half revolution of its shaft 123.

The vertically movable rod or ram that removes the cores 27 from the tires 26 is designated 126 and it is slidably mounted for vertical movement in the boss 70 and in a lower ram bearing 127 mounted on the base plate 16. As is most clearly shown in Figure 8, one side of said ram is formed with rack teeth 128 that are meshed with a pinion 129 that operates through a slot in said boss. The pinion 129 is mounted upon one end of a shaft 130 that is journaled in suitable bearing brackets on the framework 15, the other end of said shaft being provided with a gear pinion 131 that is meshed with a horizontally disposed rack 132 as is most clearly shown in Figure 7. The latter is slidably mounted in a suitable slideway 133 on the framework 16, and extends toward the bull gear 110, its end portion thereat being provided with a cam roller 134 that is engaged in cam-groove 111 at a point therein diametrically opposite the cam-roller 112.

Figure 13:
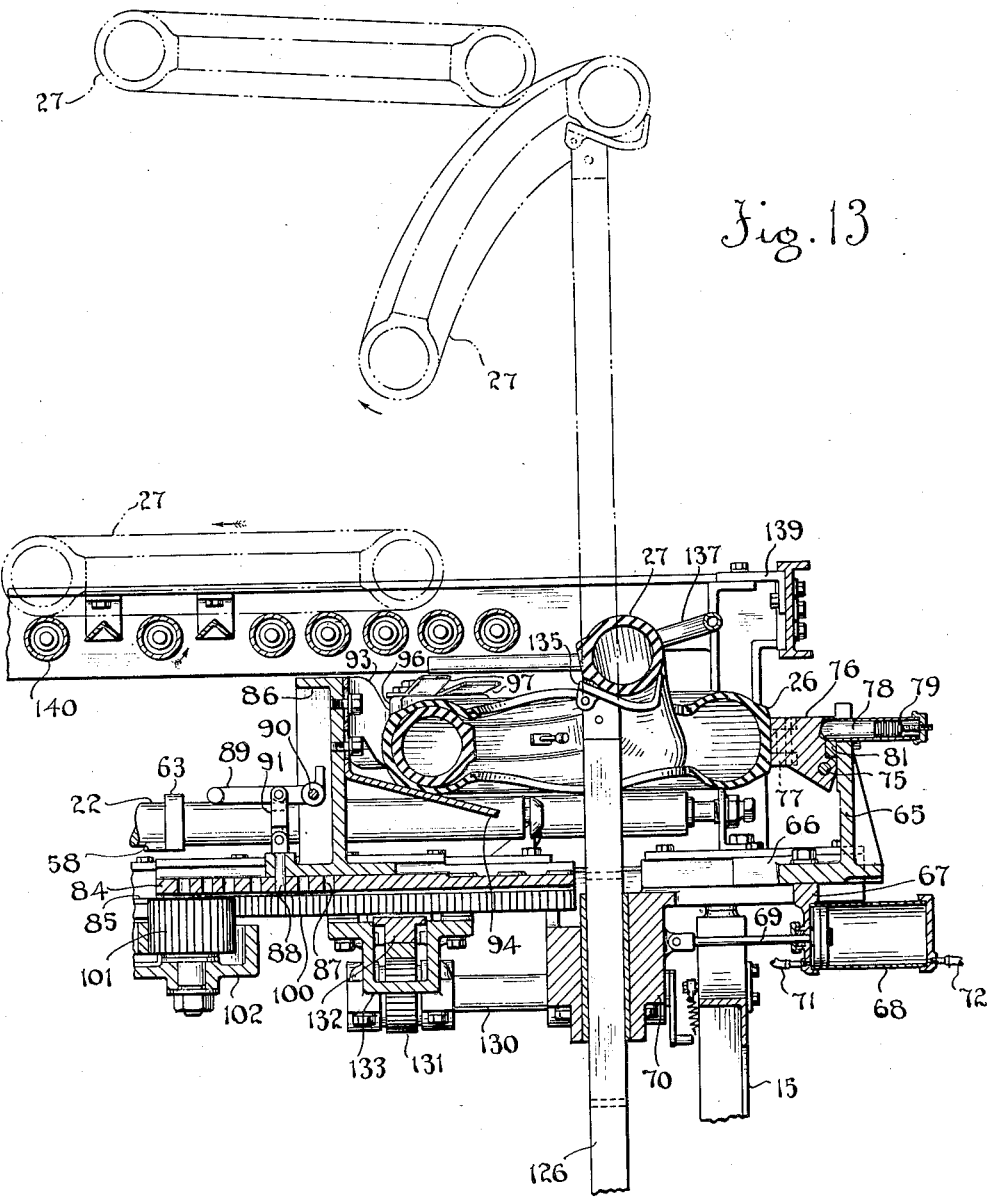
Figure 13 is a view of a part of the mechanism shown in Figure 11, during a subsequent stage of operation.

For engaging the exposed cores 27, the upper end of the ram 126 carries a pivotally mounted hook 135, the free end of which is so arranged as to enter between the outer periphery of the core 27 and the inner surface of a tire 26, when the tire and core are deformed, as is best shown in Figures 11 and 13. The vertical movement of the ram 126 is sufficient to push a core completely out of a tire, after the hook 135 has engaged said core. The arrangement is such that the ram 126 is reciprocated to remove the cores 27 from tires 26 in timed relation to the drive of the feed rollers 22, 23 and the operation of the mechanism that deforms the tires so as properly to present the cores for engagement with core-removing means.

In order to avoid extreme distortion of the upper bead of a tire as the core is withdrawn therefrom, a generally semi-circular guard member 137 is positioned above the normal core-extracting position of the tire 26, the arrangement being such that the guard 137 will be engaged by that portion of the upper bead of a tire that is lifted and distorted by the drag of the core that is being extracted, the guard thus limiting said distortion so as to prevent any permanent deformation of the bead.

The guard member 137 is supported upon a cross member of a superposed conveyor comprising a framework 139 that is supported upon the framework 15, and a series of feed rollers 140, 140 journaled in said framework 139. The superposed conveyor is provided for removing the cores 27 from the apparatus after they have been extracted from tires, and it is disposed transversely with relation to the work-delivery and work-removing conveyors previously described. As is most clearly shown in Figures 2, 4, 11 and 13, the feed rollers 140 extend only part way over the core-extracting station, there being sufficient space between the guard member 137 and nearest roller 140 to permit the passage of a core 27 therebetween as said core is withdrawn from a tire.

The rollers 140 are driven in the same manner as the feed rollers 22, 23, by an endless sprocket chain 141 trained about suitable sprockets on the rollers 140 and intermediate idler sprockets. One of the rollers 140 has an elongate shaft 142 upon which is mounted a sprocket 143, and the latter is connected by a sprocket chain 144 with a sprocket 145 on a countershaft 146. The countershaft 146 is journaled in a bracket 147 that is adjustably carried by a bracket 148 on the side of framework 15, as shown in Figure 1, said countershaft also carrying a sprocket 149 that is connected by a sprocket chain 150 with a suitable sprocket (not shown) on the shaft of the constantly driven motor 46. The arrangement is such that the feed rollers 140 are constantly driven in the direction indicated by the arrows to convey extracted cores 27 away from the core-extracting station.

For operating the fluid pressure cylinder 68 in timed relation to the operation of ram 126, one end of shaft 130 is provided with a radial arm 152 that has a laterally projecting stud 153 mounted in its free end. The valve 73 is mounted substantially in axial alignment with shaft 130 and is provided with an operating lever 154 that extends into the orbit of stud 153. A tension spring 155 connected to the lever 154 and to framework 15 urges said lever toward a position in which pressure fluid from valve 73 is in communication with the rear end of cylinder 68 to effect retraction of head 65, as shown in Figure 13.

As is most clearly shown in Figure 9 in the lowered or inoperative position of ram 126, the arm 152 on shaft 130 is beneath lever 154 and holds it in a raised position, against the tension of spring 155, whereby fluid through valve 73 is in communication with the front end of cylinder 68 as shown in Figures 4 and 11. The raising of ram 126 requires about one revolution of shaft 130, which moves stud 153 of arm 152 through an orbit of about 360°. This movement of stud 153 allows the spring 155 to move valve lever 154 from the full line position shown in Figure 9 to its broken line position in said figure, with the result that the valve 73 is operated to reverse the flow of fluid to the cylinder 68 whereby the latter moves to the position shown in Figure 13. The hook 135 on the end of ram 126 engages a core 27 at about the time the lever 154 reaches valve opening position, the core being partly extracted before the head 65 is fully retracted. Angular movement of the lever 154 ceases as soon as the valve 73 is reversed, and the arm 152 and stud 153 continue their orbital movement. During the downward movement of the ram 126 the stud 153 again engages the lever 154 and moves it back to its normal position, which again operates the valve 73 to reverse the flow of fluid to cylinder 68 whereby the head 65 is moved back to the normal inoperative position shown in Figures 4 and 11.

In the operation of the apparatus, the motor 46 and feed rollers 140 are constantly driven. If no cores are being extracted, the clutch 47 is closed so that feed rollers 22 and 23 are driven, and clutch 119 is open so that bull gear 110 is stationary and its cam 111 is in the position shown in Figure 3. Thus the movable tire-compressing member 86 and the movable abutment are in the positions shown in Figure 4, and the ram 126 is in lowered position. It will be observed in Figure 3 that the cam 111 has a concentric portion or dwell A of 160° and an eccentric portion B of 200°, and that the cam roller 134 is centrally located in dwell A of the cam and cam roller 112 is centrally located in the eccentric portion B of the cam. The apparatus automatically is set in operation by the work.

A tire 26 with core 27 therein is fed by the rollers 22 of the work-delivery conveyor to the core-extracting station, and when it reaches the proper position therein it trips the trip-lever 63 to close the switch 56 which operates the limit switch 122 to open magnetic clutch 47 and energize magnetic brake 48, and to close magnetic clutch 119 and release magnetic brake 120. This stops the feed of rollers 22, 23 and brings the work to rest, and starts rotation of the bull gear 110 and cam 111 thereon.

Figure 3:
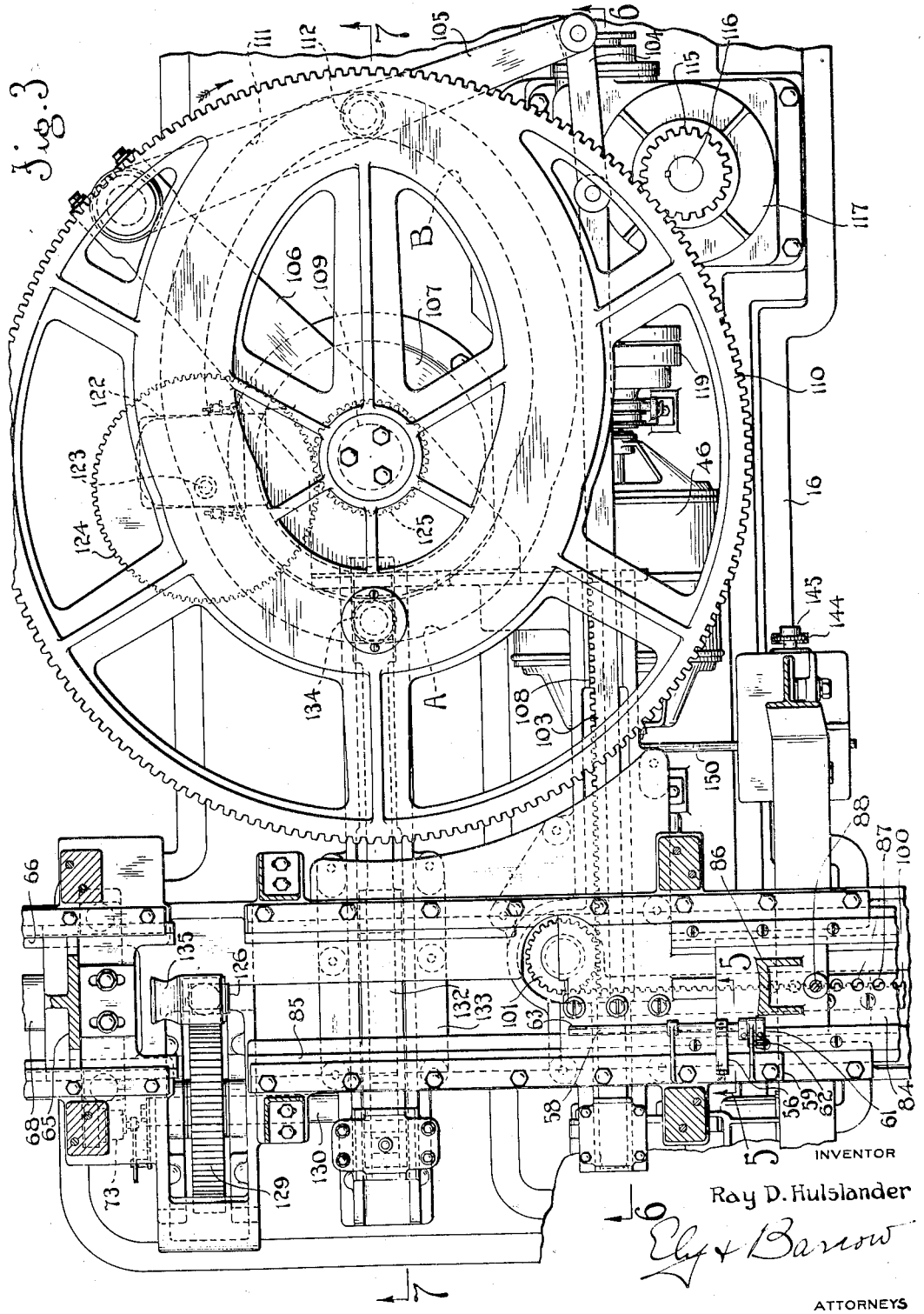
Figure 3 is a sectional plan view on the line 3—3 of Figure 1.
Figure 12:
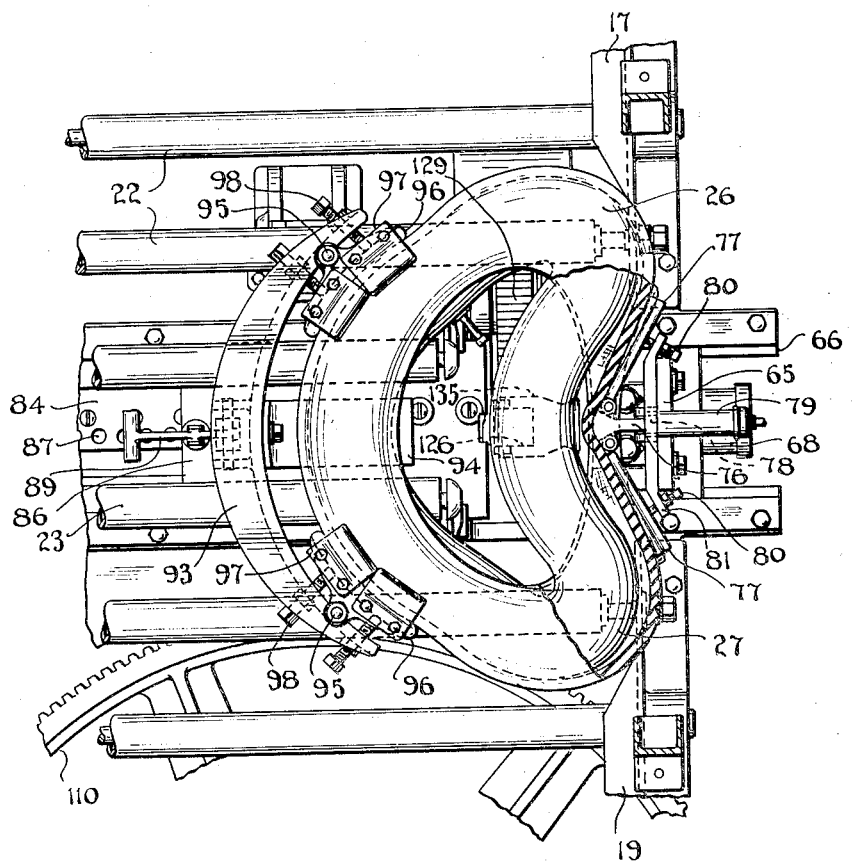
Figure 12 is a sectional plan view on the line 12—12 of Figure 11.

First result of the rotation of cam 111 is to swing the lever-arm 105 toward the left as viewed in Figure 3 and thus to move rack 103 longitudinally, and, by means of the interconnected gearing, to move the movable work-compressing member 86 across the conveyors, whereby it engages the tire 26 and moves it against the retractable abutment on the opposite side of said conveyors, as is shown in Figure 12. The retractable abutment is so shaped as to form a deep re-entrant in the tire whereby the beads of the latter are spread apart and the core therein completely locally exposed. Complete compressing of the tire requires 100° of rotation of the cam 111, but when it has rotated 80° the cam roller 134 has moved off the cam dwell A and onto portion B of the cam whereby the rack 132 is moved longitudinally to start elevating the ram 126. The hook 135 on the ram does not, however, reach and engage the core 27 until the cam has turned 100° and the work is completely compressed, cam roller 112 then passing into the dwell portion A of the cam.

As soon as the rising ram-hook 135 has engaged and started lifting the core 27, as shown in Figure 11, the valve-lever 154 will have reached the broken line position shown in Figure 9, to reverse valve 73 and admit fluid pressure to the rear end of cylinder 68 whereby the latter moves to retract the head 65 of the movable abutment. This relieves some of the strain on the deformed tire, and, in conjunction with the guard member 137, prevents sharp flexure of the upper tire bead as the core is pushed out of the tire.

The ram continues to rise and reaches the top of its stroke when the cam has turned 180°. In pushing the core from the tire, said core is so flexed and deformed that as soon as it is free from restraint of the tire its normal resilience causes it quickly to restore itself to normal shape. In doing so the tire flips itself off the ram hook 150

135, and falls onto the conveyor rolls 140, which being constantly driven, convey the core to a determinate destination.

As the cam 111 continues to rotate the ram 126 moves downwardly, and when it has completed 240° rotation, cam roller 112 enters portion B of the cam and retractive movement of the work compressing structure 86 commences. The ram reaches its lower, inoperative position when the cam has turned 270°, and the structure 86 reaches its normal inoperative position when the cam completes a full revolution. During the downward movement of the ram 126 the arm 152 engages the valve-lever 154 and moves the latter to the full-line position shown in Figure 1, thereby reversing the cylinder 68 and moving the retractable abutment to its normal inoperative position. When the cam has made a complete revolution the limit switch 122 also completes an operative cycle and immediately acts to open magnetic clutch 119 and apply brake 120, and to close magnetic clutch 47 and release brake 48. This stops the drive of the bull gear 110 and cam 111 and starts the drive of the work-conveyor rollers 22, 23, which convey away the tire from which the core has been extracted, and bring another tire, with core therein, to the core-extracting station, where the operations described are repeated.

It will be seen that the operation of the apparatus is fully automatic, and that it is set in motion by the work itself. The apparatus saves time and labor in the removing of expansible cores from tires, and it achieves the other objects set out in the foregoing statement of objects.

Modification may be resorted to without departing from the spirit of the invention or the scope of the appended claims, which are not limited wholly to the specific construction shown or exact procedure described.

What is claimed is:

1. The method of removing cores from tires which comprises applying radially directed force locally to a tire so as locally to deform it and to eject a portion of the core therein radially inwardly of the beads of the tire, and then applying a transversely directed force locally to the exposed portion of the core to remove the core from the tire.

2. The method of removing cores from tires which comprises forming a local, radial, re-entrant in a tire to spread the beads thereof and expose the core therein, and then pushing the core from the tire by force applied to the exposed portion of the core.

3. The method of removing flexible cores from tires which comprises applying force to one side of a tire to move the latter in its own plane against a stationary abutment whereby a re-entrant is formed in the opposite side of the tire and its beads are spread apart to expose the core therein, and then applying transversely directed force against the exposed portion of the core to remove the latter from the tire.

4. In apparatus for removing cores from tires, the combination of means for feeding a succession of tires by movement of translation in their own plane, means actuated by the leading tire for halting the feed of all the tires, and means set into motion by said tire actuated means for removing the core from the leading tire.

5. A combination as defined in claim 4 in which the core is removed from the tire while the latter is in its plane of translation.

6. In apparatus for removing cores from tires, the combination of means for forming a local re-entrant in a tire to spread the beads thereof and expose the core therein, and a ram movable parallel to the axis of the tire adapted to engage the exposed portion of said core to push the latter from the tire.

7. In apparatus for removing cores from tires, the combination of an abutment, a movable member movable toward said abutment and adapted to force a tire thereagainst so as locally to deform the tire and expose the core therein, and a ram movable parallel to the axis of the tire adapted to engage the exposed portion of the core and push said core from the tire.

8. A combination as defined in claim 7 including means for alternatively positioning the movable member so as to engage tires of various diameters.

9. In apparatus for removing cores from tires, the combination of a retractable abutment, a movable member movable toward said abutment and adapted to force a tire thereagainst so as locally to deform the tire and expose the core therein, a ram movable parallel to the axis of the tire adapted to engage the exposed portion of the core and push said core from the tire, and means for retracting the retractable abutment in timed relation to the movement of the ram to prevent excessive strain on a tire bead.

10. A combination as defined in claim 9 including cam means for moving the movable tire-deforming member and the ram in timed sequence, and means operated by the ram-operating means for retracting the retractable abutment.

11. In apparatus for removing cores from tires, the combination of a tire-delivery conveyor, a tire-removing conveyor, a core-removing conveyor, means disposed between the tire-delivery conveyor and tire-removing conveyor for deforming a tire to expose a portion of the core therein, means for engaging the exposed portion of the core and removing the core and placing it on the core-delivery conveyor, and a single power means for operating the aforesaid mechanisms.

12. A combination as defined in claim 11 including means actuated by a tire for starting and stopping the tire conveyors and for operating the tire deforming and core-extracting mechanisms in timed sequence.

RAY D. HULSLANDER.